US008347920B2

(12) United States Patent  
Pawelski

(10) Patent No.: US 8,347,920 B2
(45) Date of Patent: Jan. 8, 2013

(54) PRESSURIZED FLUID POSITIONER CONTROL SYSTEM

(75) Inventor: Joseph W. Pawelski, Loveland, CO (US)

(73) Assignee: Flexibility Engineering, LLC, Loveland, CO (US)

( * ) Notice: Subject to any disclaimer, the term of this patent is extended or adjusted under 35 U.S.C. 154(b) by 386 days.

(21) Appl. No.: 12/696,999

(22) Filed: Jan. 29, 2010

(65) Prior Publication Data

US 2011/0186144 A1    Aug. 4, 2011

(51) Int. Cl.
*F16K 31/12* (2006.01)
(52) U.S. Cl. ............. 137/869; 137/870; 137/505.14; 251/30.01; 198/836.3
(58) Field of Classification Search ............ 137/869, 137/870, 505.14; 251/30.01; 198/836.3
See application file for complete search history.

(56) References Cited

U.S. PATENT DOCUMENTS

| | | | |
|---|---|---|---|
| 1,929,707 A | 10/1933 | Mojonnier | |
| 2,095,820 A | 10/1937 | Lenz | |
| 2,484,603 A | 10/1949 | Audemar et al. | |
| 2,750,953 A * | 6/1956 | Helsley, Jr et al. | 137/118.06 |
| 2,807,125 A | 9/1957 | George | |
| 3,156,157 A * | 11/1964 | Smith et al. | 91/48 |
| 3,612,297 A | 10/1971 | Lapostolet | |
| 3,687,059 A | 8/1972 | Plattner et al. | |
| 4,020,862 A * | 5/1977 | Bohnlein et al. | 137/115.23 |
| 4,191,215 A * | 3/1980 | Gonner | 137/870 |
| 4,264,002 A | 4/1981 | Van Der Schie | |
| 4,495,968 A * | 1/1985 | Kist | 137/624.2 |
| 5,074,608 A | 12/1991 | Gabriel | |
| 5,161,919 A | 11/1992 | Smith et al. | |
| 5,211,280 A | 5/1993 | Houde | |
| 5,237,906 A | 8/1993 | Raymond | |
| 5,542,789 A | 8/1996 | Aidlin et al. | |
| 5,558,200 A | 9/1996 | Whitby et al. | |
| 5,566,816 A | 10/1996 | Gross et al. | |
| 5,630,679 A | 5/1997 | Simkowski et al. | |
| 5,699,896 A | 12/1997 | Spada et al. | |
| 5,733,090 A | 3/1998 | Fuke et al. | |
| 5,967,167 A * | 10/1999 | Johnson | 137/14 |
| 6,190,094 B1 | 2/2001 | Rediess et al. | |
| 6,196,788 B1 | 3/2001 | Talbot et al. | |
| 6,240,956 B1 * | 6/2001 | Johnson | 137/505 |
| 6,241,072 B1 | 6/2001 | Ingraham | |

(Continued)

FOREIGN PATENT DOCUMENTS

CA         2048289       11/1995

OTHER PUBLICATIONS

U.S. Appl. No. 13/417,021, Office Actio dated Apr. 23, 2012.

*Primary Examiner* — Eric Keasel
*Assistant Examiner* — Minh Le
(74) *Attorney, Agent, or Firm* — Santangelo Law Offices, P.C.

(57) ABSTRACT

The inventive technology, in embodiments, may include a controller configured to coordinate operation of valves and remotely controllable regulators that are fluidically communicative therewith, allowing the control of positioners of positioner zones that are fluidically communicative with such remotely controllable regulators. Preferred embodiments may find application as, e.g., a pneumatic system to control positioners, whether such positioner find use in bottling applications or elsewhere. Additional aspects of the inventive technology may relate to methods for pressurized fluid positioner control.

52 Claims, 3 Drawing Sheets

U.S. PATENT DOCUMENTS

| | | |
|---|---|---|
| 6,296,226 B1 * | 10/2001 | Olsen ............................ 251/26 |
| 6,305,528 B1 | 10/2001 | Leonard |
| 6,309,144 B1 | 10/2001 | Ingraham |
| 6,318,935 B1 | 11/2001 | Ouellette |
| 6,332,740 B1 | 12/2001 | Bernard et al. |
| 6,389,341 B1 | 5/2002 | Davis |
| 6,408,740 B1 | 6/2002 | Holt et al. |
| 6,514,015 B1 | 2/2003 | Trenel et al. |
| 6,578,702 B2 * | 6/2003 | Falkowski .................... 198/575 |
| 6,589,008 B1 | 7/2003 | Ingraham |
| 6,685,401 B1 | 2/2004 | de Almeida Rodrigues et al. |
| 6,827,203 B2 | 12/2004 | Andreoli et al. |
| 6,886,841 B2 | 5/2005 | Coombs et al. |
| 6,957,533 B1 | 10/2005 | Olsson |
| 7,085,636 B2 | 8/2006 | Song et al. |
| 7,104,180 B2 | 9/2006 | Hall et al. |
| 7,152,405 B2 | 12/2006 | Friedsam et al. |
| 7,210,572 B2 | 5/2007 | Ingraham |
| 7,721,876 B2 | 5/2010 | Hartness et al. |
| 7,887,064 B2 | 2/2011 | Inoue |
| 7,891,484 B2 | 2/2011 | Ranger |
| 8,037,896 B2 * | 10/2011 | Shajii et al. ................ 137/487.5 |
| 8,132,665 B2 * | 3/2012 | Pawelski .................... 198/836.3 |
| 2003/0164280 A1 | 9/2003 | Delaporte et al. |
| 2003/0205447 A1 | 11/2003 | Ledingham |
| 2005/0199287 A1 * | 9/2005 | Shajii et al. ................ 137/487.5 |
| 2007/0095247 A1 | 5/2007 | Ingraham |

* cited by examiner

PRESSURIZED FLUID POSITIONER CONTROL SYSTEM

BACKGROUND

The need to accurately position—and reposition as a new application may require—one or more items for proper operation of systems and apparatus has been known in several industries for years. Perhaps the most well known such positioner is a side guide positioner, which may find application in the bottling industry to maintain proper position of containers (bottles or cans, as but two examples) as they travel along a conveyor during processing (filling, capping, etc.). A similar type of positioner may operate as part of a palletizing system to maintain the proper position of pallets as they travel along a conveyor, whether for pallet manufacture or pallet loading. Positioners may also find application as part of a differential valve controller, an HVAC mixing control system (as a substitute for expensive blowers), a solar panels (e.g., to maintain optimal orientation relative to the sun) and a programmable vehicle suspension system (where ground clearance is controlled), as but three of many examples. Indeed, the inventive pressurized fluid positioner control system disclosed and claimed herein may be used to control the position of components of several different types of systems, whether such systems involve repeated monitoring and adjustment to assure proper positioning (e.g., during a single "run" on a single bottle size) or not.

There have been attempts in the past to provide position control systems that accurately adjust component(s), perhaps on a continual basis, to assure proper positioning by positioners and/or facilitate adjustments necessitated by the different size of an item processed for a specific "run." However, such systems are often prohibitively costly, unnecessarily complex, and/or simply do not afford all the benefits afforded by the inventive technology.

FIG. 1A shows a prior art system. In it, compressed air from a compressor 21 is fed to a manual regulator 22 and thereafter a main tank 23 that then manifolds to, in this specific example, three digital proportional pressure regulators 3, each of which then manifold to solenoid valves 71, each of said solenoid valves fluidically connected (downflow) to accumulation tanks 72 and, further downflow, positioners of a positioner zone. Accumulation tanks, as explained below, increase volume of the zone's fluidic system and thereby prevent an impairing loss of pressure in the event of non-catastrophic leaks. A controller 10 provides control to coordinate valve operation with operation of the digital proportional pressure regulator. FIG. 1B shows a prior art system in which each of several digital proportional regulators 3 feed to manifolded positioners 11 of one of several positioner zones 9.

SUMMARY OF THE INVENTION

The inventive technology, in embodiments, may include a controller configured to coordinate operation of valves and remotely controllable regulators that are fluidically communicative therewith, allowing the control of positioners of positioner zones that are fluidically communicative with such remotely controllable regulators. Preferred embodiments may find application as, e.g., a pneumatic system to control positioners, whether such positioner find use in bottling applications or elsewhere. Additional aspects of the inventive technology may relate to methods for pressurized fluid positioner control.

The benefits of exemplary embodiments disclosed herein may include system-wide efficiency, robustness of design leading to reduced component requirements, reduced maintenance, reduced setup and operation costs, and improved performance, as but two examples. More particular, advantages of certain embodiments of the inventive technology include but are not limited to: the provision of the ability to achieve an infinite number positioner responses (e.g., distances between side rails, for example) due to the infinite (perhaps "analog" type) number of pressures achievable by the system; the ability to reduce hysteresis observed in positioner response; the ability to simultaneously do the following: (a) alternatingly monitor (and adjust as necessary) a pilot pressure input 16 for each of a plurality of piloted regulators 8 while (b) automatically continually maintaining regulator output 14 pressure; and the use of only two connections between the valves 5 and piloted pressure regulator input 16 (which mitigates the risk of leaks, and may result in isolated pressure maintenance between valves and piloted pressure regulator for up to two days in some applications).

An additional advantage of particular embodiments is the provision of a continuous supply of air to the piloted pressure regulator input 16 and available at its output (such that, even in the event of a leak downflow of the piloted pressure regulator, lost pressure can be replaced instantaneously); such eliminates the need for zone accumulation tanks 72, which would otherwise be needed to increase volume of the zone's fluidic system and thereby prevent an impairing loss of pressure in the event of non-catastrophic leaks. Further, such continuous supply of air, and the related fact that preferred embodiments are not conventional "control volume" systems, allows for fast venting—and avoidance of pressure buildup when, e.g., a positioner 11 has a guide rail bumped in a compressing direction. Such fast venting is another reason why preferred embodiments of the inventive technology may be termed a true constant pressure system.

Additional advantages relate to the low cost of piloted proportional regulators 8 (as compared with electronic regulators), and their high accuracy and fast response time, and their avoidance of control problems and operational difficulties associated with spring based regulators (e.g., non-constant spring rates). Of course, other advantages of the inventive technology may be disclosed in the remainder of the specification.

DESCRIPTION OF THE PREFERRED EMBODIMENTS

As mentioned earlier, the present invention includes a variety of aspects, which may be combined in different ways. The following descriptions are provided to list elements and describe some of the embodiments of the present invention. These elements are listed with initial embodiments, however it should be understood that they may be combined in any manner and in any number to create additional embodiments. The variously described examples and preferred embodiments should not be construed to limit the present invention to only the explicitly described systems, techniques, and applications. Further, this description should be understood to support and encompass descriptions and claims of all the various embodiments, systems, techniques, methods, devices, and applications with any number of the disclosed elements, with each element alone, and also with any and all various permutations and combinations of all elements in this or any subsequent application.

Figure 1:
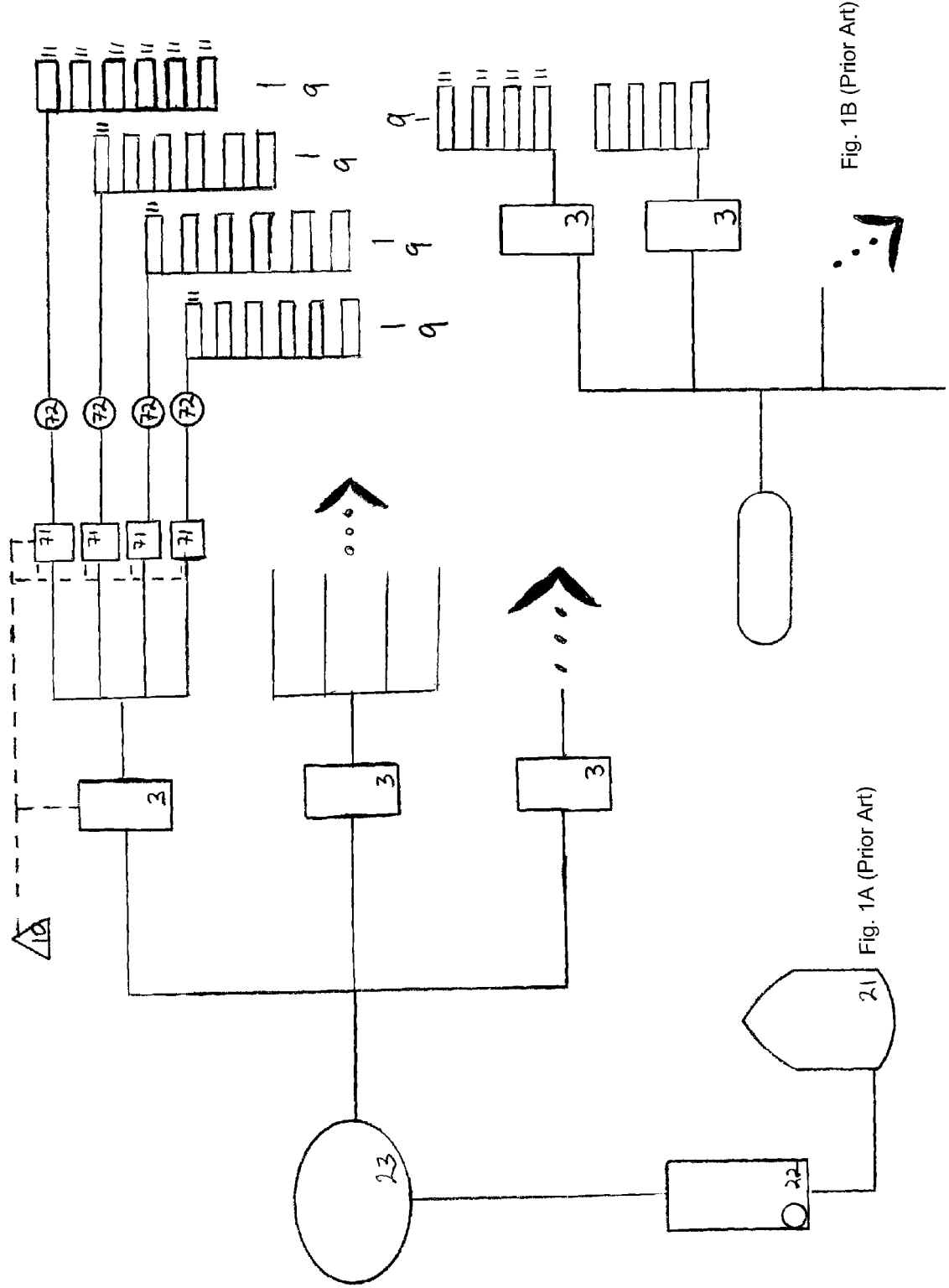
FIGS. 1A and 1B show schematics of prior art apparatus.

At least one embodiment of the inventive technology may be described as a position control apparatus 1 that comprises a electronic pressure regulator 2 (e.g., a digital pressure regulator, such as a digital proportional pressure regulator 3) established downflow of and in fluidic communication with a compressed air source 4; valves 5 (e.g., valves that are at least part of a valve assembly 6 such as a valve bank, preferably with two positions—one open and one closed) established downflow of and in fluidic communication with the electronic pressure regulator 2; a plurality of remotely controllable regulators 7 (e.g., piloted pressure regulators 8, or electronic pressure regulators) established downflow of and in fluidic communication with the valves 5; a plurality of positioner zones 9 established downflow of and in fluidic communication with the remotely controllable regulators; and a controller 10 configured to coordinate operation of the electronic pressure regulator with the valves. In preferred embodiments, a different one of the remotely controllable regulators is in fluidic communication with a different one of the positioner zones. Positioner zones 9 may each include one or more positioners 11 (each of which requires a pressurized input for proper functioning) that, as discussed below, have a particular bias constant. It is of note that the compressed air source may include an air compressor 21, a regulator (manual regulator 22, as but one example), and a main tank 23 (see that portion of the prior art FIG. 1A that includes and is upstream of main tank 23) in particular embodiments, but indeed any manner of providing compressed air (that, while insufficiently regulated for the positioners, is not so unregulated that its pressures vary to an unacceptable degree) might be used as the compressed air source 4.

Particularly when the remotely controllable regulators 7 are piloted pressure regulators 8, they may include two inputs 12, 13 and one output 14. The two inputs may be an insufficiently regulated input 15 (a pressure input that is insufficiently regulated and most always different from the intended pressure output, and that, upon being further regulated, becomes the output; it may be compressed air from the compressed air source) and a pilot input 16 (which serves as the "base" pressure to which the control input is to be regulated to arrive at the intended output pressure). Often, the remotely controllable regulator will provide a 1:1 ratio of control to output pressure. As such, the pilot pressure and the output pressure may be the same. Examples of piloted pressure regulators include but are certainly not limited to the Parker 10R.

Figure 2:
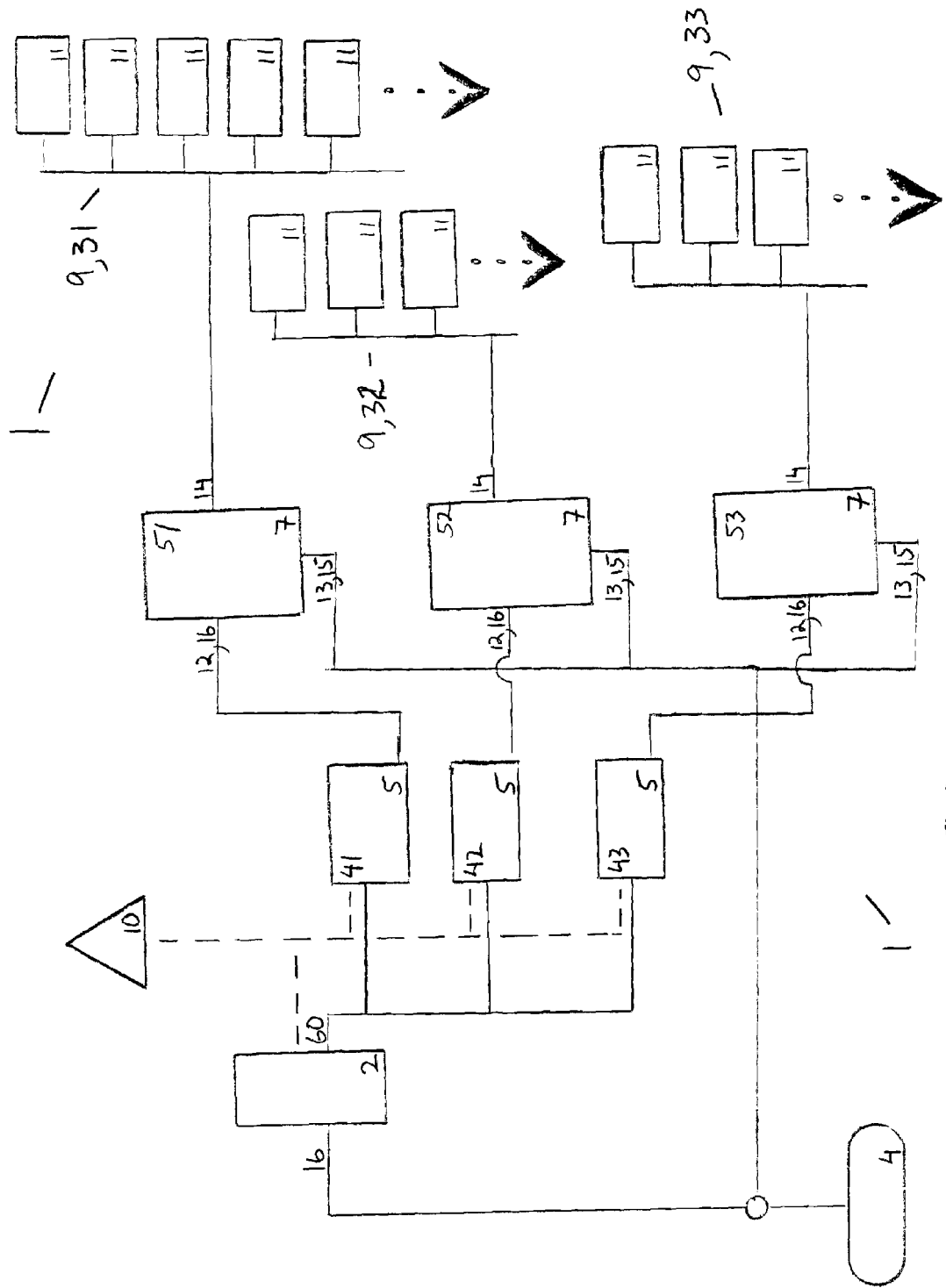
FIG. 2 shows a schematic of an embodiment of the inventive technology.
Figure 3:
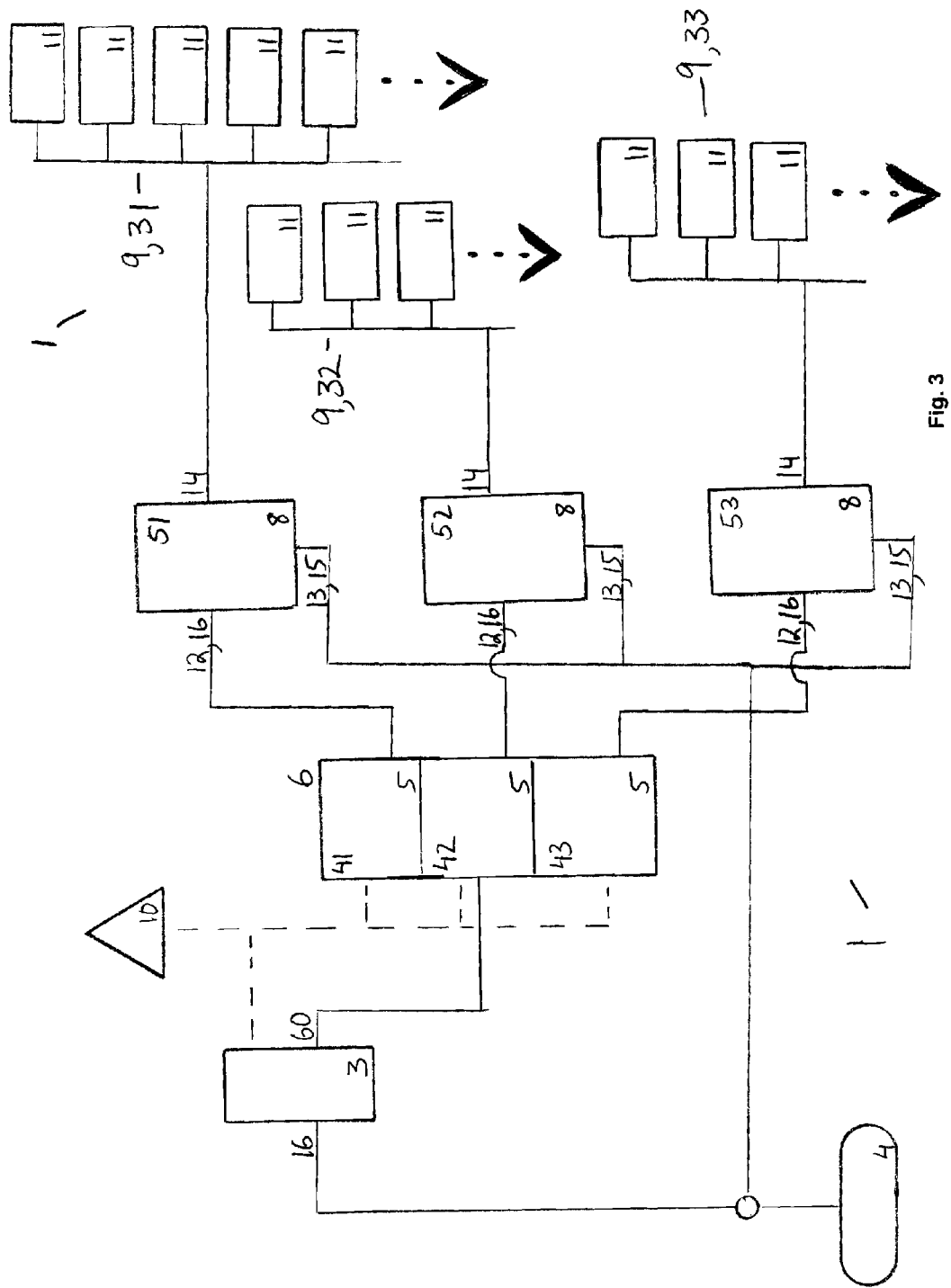
FIG. 3 shows a schematic of an embodiment of the inventive technology.

As suggested by FIGS. 2 and 3, various components of the apparatus are in fluidic communication with one another. The electronic regulator 2 may be in fluidic communication with a source of compressed air 4 (typically insufficiently regulated for the positioners); this air may also be fed to (such that it is in fluidic communication with) the remotely controllable regulators 7, thereby providing insufficiently regulated input 15 thereto. As such, the insufficiently regulated input (of the remotely controllable regulators) may be in fluidic communication with an electronic pressure regulator input 16. It is of note that when valves are established between the remotely controllable regulators and the electronic regulator, the pilot input to such regulators may be output from the electronic regulator through the valves. As such, the pilot input may be in fluidic communication with a electronic pressure regulator output. This is even the case where a valve (e.g., as a valve assembly) is established therebetween (and operates to close any pressurized fluid conveyance lines established therebetween at times), as the term "fluidic communication" as used herein describes even those system components that are in fluidic communication only at certain times (e.g., a piloted pressure regulator is deemed in fluidic communication with the electronic regulator even though at times there is a closed valve between them). Of course, where appropriate, manifolds may be used to effect fluidic communication as desired.

As mentioned, a preferred embodiment of the inventive technology may include a controller 10 configured to coordinate operation of the electronic pressure regulator 2 with the valves 5. More particularly, each of the remotely controllable regulators 7 may have a specific pressure associated therewith, each of which may be different, as indeed, each remotely controllable regulator may be dedicated to a different positioner zone 9. And each of such zones may have one or a plurality of positioners having a bias constant within a different range. For example, Zone 1 (31, with which the first remotely controllable pressure regulator may be associated) may include only those positioner(s) 11 having a bias constant (e.g., a spring constant) of 0.50-0.59 lbs per inch of displacement (inclusive), while Zone 2 (32, with which the second remotely controllable pressure regulator is associated) may include only those positioner(s) 11 having a bias constant of 0.60-0.69 lbs per inch (inclusive). In this manner, where a specific positioner response (e.g., a specific distance between positioner guides such as side guides for bottling applications) is desired, a particular pressure can be applied to predictably achieve the desired positioner response. What one may see often is the desire that positioners 11 have an identical or sufficiently similar response (i.e., an identical or sufficiently similar distance between positioning components), but, because of the different bias constants of the positioners (perhaps as purchased off the shelf, and a result of manufacturing variance), a need to group positioners according to bias constant ranges. A zone may have any number of positioners therein (e.g., 1, 5, 10, 50, 200 as but five examples). It is also of note that positioner zones need not necessarily be grouped depending on their characteristic bias constant, as indeed, zones may be arranged such that one zone includes positioners that are to yield a first response (e.g., exhibit first distance between positioner), and different zone(s) positioners that are to yield a second response (e.g., exhibit first distance between positioner); indeed, in such application, any differences bias constants of positioners may be irrelevant.

More specifically, under certain positioner response requirements (e.g., each positioner must achieve a position that is within +/−0.02 inches of a certain distance), the application of an identical pressure to all positioners 11 that must meet this constraint will result in the failure to meet this constraint (again, this is due to the variant response of different positioners to a certain pressure because of different positioner bias constants). A solution is to group positioners 11 according to bias constants (as explained above) such that one pressure applied to one positioner group will effect positioner response within constraints and a different pressure applied to a different group will effect a positioner response within such constraints. Of course, given the application, and as one of ordinary skill in the art can appreciate, the number of zones into which the positioners must be grouped (again, as based on a bias constant, typically as measured), and the bias constant ranges for each, depend on the particular application, as does the necessary pressures for the various zones 9. Further, a simple measurement or calculation may be all that is needed to determine the pressure needed for a particular positioner zone 9. Controlled, repeated and alternating application of appropriate pressures as effected by embodiments of the inventive technology results in desired positioner response (e.g., sufficiently identical) along, e.g., an entire bottle line (having a plurality of positioner zones).

The controller 10 (a broad term that includes any type of controller, whether electronic or not, microcontroller based or not, or digital or not, and often is a type of processor such as a PLC) may be configured to repeatedly open and close valves 5, preferably controlling valves such that only one valve at most is open at a time. Indeed, the controller 10 may be configured to operate the electronic pressure regulator 2 and open and close valves so as to as to alternatingly direct a different specific pressure to a different one of the remotely controllable regulators 7, thereby assuring that the applied pressure is the appropriate pressure for the positioner group to which that remotely controllable regulator is dedicated.

More particularly, when all valves 5 are closed, and immediately before operation of the valves, unregulated line pressure (which may be one of the inputs for all piloted pressure regulators) from compressed air source 4 pressurizes each of the positioners of the various zones. However, of course, such pressures must be adjusted to the appropriate pressure for each specific zone. In order to adjust the Zone 1 pressure to Positioner Zone 1 (31, where the Zone 1 pressure is that pressure that achieves the desired response of those positioners 11 in Zone 1), the controller 10 may control the electronic pressure regulator 2 to output Zone 1 pressure. Then, after a short time until equilibrium is reached in the pressurized fluid conveyance lines between the electronic pressure regulator and the valves 5 (where all such valves may be closed while such equilibrium is achieved, and where such time depends on the application, and is easily detected by simple observation and perhaps pressure testing), the valve 41 corresponding to Positioner Zone 1 31 (and the piloted pressure regulator 51 dedicated thereto) may be opened, the pressurized fluid from the electronic regulator 2 acting to adjust the insufficiently regulated input to the piloted pressure regulator 51 to the proper Zone 1 pressure. Then, after a certain period of time (perhaps to achieve equilibrium to the zone 1 pressure in pressurized fluid conveyance lines upflow of the positioners of Positioner Zone 1, or perhaps as long as possible without compromising operation of positioners of other zones), the valve 41 corresponding to zone 1 may be shut (and all valves will, at that time, be closed).

Continuing with operational details of a particular embodiment of the inventive technology, when a valve 5 to a zone 9 is closed, the pressure in the conveyance lines downflow of that valve and upflow of the piloted pressure regulator 8 is isolated and remains to keep the positioner response as desired. Unregulated line air still flows to the piloted pressure regulator 8 and then to the positioners of the zone. Typically, immediately after the valve 41 for Zone One 31 is closed (such that all valves are closed), the controller may signal the electronic pressure regulator 2 to output the zone 2 pressure, and a period of time may elapse before the valve 42 corresponding to Zone Two 32 is then opened (such that the aforementioned equilibrium may be achieved upflow of the valves). Then, the valve 42 corresponding to Zone 2 may be opened, such that the Zone 2 pressure is applied to the positioners 11 of Positioner Zone Two 32, thereby achieving the desired response of such positioners. After a certain time (at least long enough to achieve equilibrium of the pressure applied to the positioners in zone 2), the zone 2 valve 42 is closed by the controller 2, which then continues the process relative to the next zone (i.e., setting the pressure appropriate for such zone, achieving equilibrium between the electronic regulator and the valves, opening the valve for such zone, achieving equilibrium in lines upflow of the positioners of such zone, closing the valve for such zone). This process may continue until all zones are properly pressurized as is appropriate for each zone, and then cycle again through all zones, starting with zone 1 (perhaps as a check to assure that the appropriate pressure is still being applied to each specific zone). It is of note that not all of the above steps are necessarily required features (e.g., achieving equilibrium when all valves are closed might not be necessary), but in certain applications, may, together, effect the best operation. Also, in certain embodiments, it may be preferred to keep the line pressure at least slightly above the largest zone pressure, depending on the operational capabilities of the remotely controllable regulators 7.

At least one embodiment of the inventive technology may be described as a position control method that comprises the steps of remotely controlling a first piloted pressure regulator 51 so as to apply a first pressure to a first positioner zone 31; then remotely controlling a second piloted pressure regulator 52 so as to apply a second pressure to a second positioner zone 32. Additional steps may include remotely controlling a third piloted pressure regulator 53 so as to apply a third pressure to a third positioner zone 33, operating a controller 10 to terminate application of the first pressure to the first positioner zone 31 and initiate application of the second pressure to the second positioner zone 32. Such step may include the steps of operating a controller 10 to close a first valve 41 and open a second valve 42 and operating a controller 10 to change an electronic pressure regulator output 60 (e.g., an output from a digital pressure regulator 3) from said first pressure to said second pressure. The step of operating a controller 10 to open and close a different valve may comprise the step of operating a controller 10 to alternatingly apply a different pressure to the first positioner zone 31 and then to the second positioner zone 32 (and then to the third zone 33, if it exists). Of course, as explained above, each of the positioner zones may comprise a plurality of positioners 11 having a bias constant within a different range. A non-exhaustive presentation of examples of positioners can be found in US Pat. App. Pub. US-2009-0288725, published on Nov. 26, 2009, incorporated herein in its entirety. The "spring" in the positioners may be a metal helical spring, or contained fluid, as but two examples.

Also, the method may further comprise the step of inputting two pressure inputs to the first (or second) piloted pressure regulator 51, 52, where one of the inputs is an insufficiently regulated input 15 that is in fluidic communication with input 16 to a electronic regulator 2 (and/or a compressed air source 4) established upflow of valves 5 and the other of the inputs is a pilot input 16 that is in fluidic communication with an output from the electronic pressure regulator.

It is of note that aspects of the inventive technology may be described as using only one valve 5 for each positioner zone 9 (where such zones are organized based on positioner spring constant) and one regulator (e.g., an electronic pressure regulator 2 such as a digital proportional regulator 3) for a plurality of zones, or as using piloted pressure regulators 8 in a positioning system.

It is of note that a variety of valves 5 can be used, whether normally closed or otherwise, solenoid or otherwise. Of course, where electronic valve control (e.g., by a processor) is a feature, the valve must be controllable electronically, perhaps remotely (a solenoid valve is an exemplary valve that provides such feature). It also of note that while preferred embodiments may be pneumatic (e.g., compress air), this is not a required feature (as indeed some applications may require or benefit from other pressurized fluids, such as hydraulic fluid, water, oil, etc.).

It is of additional note that lines on the schematic diagrams filed herewith represent pressurized fluid conveyance lines (e.g., piping, tubing, etc., that is capable of conveying pressurized fluid and/or transmitting a pressure). Further, as FIGS. 2 and 3 are schematics, they are representative only and should not be used to limit the scope of the inventive technology.

As can be easily understood from the foregoing, the basic concepts of the present invention may be embodied in a variety of ways. It involves both control techniques as well as devices to accomplish the appropriate control. In this application, the control techniques are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this application is intended to serve as a basic description. The reader should be aware that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Apparatus claims may not only be included for the device described, but also method or process claims may be included to address the functions the invention and each element performs. Neither the description nor the terminology is intended to limit the scope of the claims that will be included in any subsequent patent application.

It should also be understood that a variety of changes may be made without departing from the essence of the invention. Such changes are also implicitly included in the description. They still fall within the scope of this invention. A broad disclosure encompassing both the explicit embodiment(s) shown, the great variety of implicit alternative embodiments, and the broad methods or processes and the like are encompassed by this disclosure and may be relied upon when drafting the claims for any subsequent patent application. It should be understood that such language changes and broader or more detailed claiming may be accomplished at a later date (such as by any required deadline) or in the event the applicant subsequently seeks a patent filing based on this filing. With this understanding, the reader should be aware that this disclosure is to be understood to support any subsequently filed patent application that may seek examination of as broad a base of claims as deemed within the applicant's right and may be designed to yield a patent covering numerous aspects of the invention both independently and as an overall system.

Further, each of the various elements of the invention and claims may also be achieved in a variety of manners. Additionally, when used or implied, an element is to be understood as encompassing individual as well as plural structures that may or may not be physically connected. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "controller" should be understood to encompass disclosure of the act of "controlling"—whether explicitly discussed or not—and, conversely, were there effectively disclosure of the act of "controlling", such a disclosure should be understood to encompass disclosure of a "controller" and even a "means for controlling" Such changes and alternative terms are to be understood to be explicitly included in the description.

Any patents, publications, or other references mentioned in this application for patent are hereby incorporated by reference. Any priority case(s) claimed by this application is hereby appended and hereby incorporated by reference. In addition, as to each term used it should be understood that unless its utilization in this application is inconsistent with a broadly supporting interpretation, common dictionary definitions should be understood as incorporated for each term and all definitions, alternative terms, and synonyms such as contained in the Random House Webster's Unabridged Dictionary, second edition are hereby incorporated by reference. Finally, all references listed in any list of references or other information statement filed with the application are hereby appended and hereby incorporated by reference, however, as to each of the above, to the extent that such information or statements incorporated by reference might be considered inconsistent with the patenting of this/these invention(s) such statements are expressly not to be considered as made by the applicant(s).

Thus, the applicant(s) should be understood to have support to claim and make a statement of invention to at least: i) each of the control devices as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) each system, method, and element shown or described as now applied to any specific field or devices mentioned, x) methods and apparatuses substantially as described hereinbefore and with reference to any of the accompanying examples, xi) the various combinations and permutations of each of the elements disclosed, xii) each potentially dependent claim or concept as a dependency on each and every one of the independent claims or concepts presented, and xiii) all inventions described herein.

In addition and as to computer aspects and each aspect amenable to programming or other electronic automation, the applicant(s) should be understood to have support to claim and make a statement of invention to at least: xvi) processes performed with the aid of or on a computer as described throughout the above discussion, xv) a programmable apparatus as described throughout the above discussion, xvi) a computer readable memory encoded with data to direct a computer comprising means or elements which function as described throughout the above discussion, xvii) a computer configured as herein disclosed and described, xviii) individual or combined subroutines and programs as herein disclosed and described, xix) the related methods disclosed and described, xx) similar, equivalent, and even implicit variations of each of these systems and methods, xxi) those alternative designs which accomplish each of the functions shown as are disclosed and described, xxii) those alternative designs and methods which accomplish each of the functions shown as are implicit to accomplish that which is disclosed and described, xxiii) each feature, component, and step shown as separate and independent inventions, and xxiv) the various combinations and permutations of each of the above.

With regard to claims whether now or later presented for examination, it should be understood that for practical reasons and so as to avoid great expansion of the examination burden, the applicant may at any time present only initial claims or perhaps only initial claims with only initial dependencies. The office and any third persons interested in potential scope of this or subsequent applications should understand that broader claims may be presented at a later date in this case, in a case claiming the benefit of this case, or in any continuation in spite of any preliminary amendments, other amendments, claim language, or arguments presented, thus throughout the pendency of any case there is no intention to disclaim or surrender any potential subject matter. It should be understood that if or when broader claims are presented, such may require that any relevant prior art that may have been considered at any prior time may need to be re-visited since it is possible that to the extent any amendments, claim language, or arguments presented in this or any subsequent application are considered as made to avoid such prior art, such reasons may be eliminated by later presented claims or the like. Both the examiner and any person otherwise interested in existing or later potential coverage, or considering if there has at any time been any possibility of an indication of disclaimer or surrender of potential coverage, should be aware that no such surrender or disclaimer is ever intended or ever exists in this or any subsequent application. Limitations such as arose in Hakim v. Cannon Avent Group, PLC, 479 F.3d 1313 (Fed. Cir 2007), or the like are expressly not intended in this or any subsequent related matter. In addition, support should be understood to exist to the degree required under new matter laws—including but not limited to European Patent Convention Article 123(2) and United States Patent Law 35 USC 132 or other such laws—to permit the addition of any of the various dependencies or other elements presented under one independent claim or concept as dependencies or elements under any other independent claim or concept. In drafting any claims at any time whether in this application or in any subsequent application, it should also be understood that the applicant has intended to capture as full and broad a scope of coverage as legally available. To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative embodiments.

Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible. The use of the phrase, "or any other claim" is used to provide support for any claim to be dependent on any other claim, such as another dependent claim, another independent claim, a previously listed claim, a subsequently listed claim, and the like. As one clarifying example, if a claim were dependent "on claim 20 or any other claim" or the like, it could be re-drafted as dependent on claim 1, claim 15, or even claim 715 (if such were to exist) if desired and still fall with the disclosure. It should be understood that this phrase also provides support for any combination of elements in the claims and even incorporates any desired proper antecedent basis for certain claim combinations such as with combinations of method, apparatus, process, and the like claims.

Finally, any claims set forth at any time are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

The invention claimed is:

1. A position control apparatus comprising:
   an electronic pressure regulator established downflow of and in fluidic communication with a compressed air source;
   valves established downflow of and in fluidic communication with said electronic pressure regulator;
   a plurality of remotely controllable regulators established downflow of and in fluidic communication with said valves;
   a plurality of positioner zones established downflow of and in fluidic communication with said remotely controllable regulators; and
   a controller configured to coordinate operation of said electronic pressure regulator with said valves,
   wherein each of said remotely controllable regulators is in fluidic communication with a different one of said positioner zones.

2. A position control apparatus as described in claim 1 wherein said remotely controllable regulators comprises piloted pressure regulators.

3. A position control apparatus as described in claim 2 wherein said remotely controllable regulators comprise two inputs and one output.

4. A position control apparatus as described in claim 3 wherein said two inputs comprise an insufficiently regulated input and a pilot input.

5. A position control apparatus as described in claim 4 wherein said insufficiently regulated input comprises compressed air from said compressed air source.

6. A position control apparatus as described in claim 4 wherein said pilot input is output from said electronic pressure regulator and through said valves.

7. A position control apparatus as described in claim 6 wherein said pilot input is in fluidic communication with an electronic pressure regulator output.

8. A position control apparatus as described in claim 1 wherein said valves are at least part of a valve assembly.

9. A position control apparatus as described in claim 8 wherein said valve assembly comprises a valve bank.

10. A position control apparatus as described in claim 1 wherein said electronic pressure regulator comprises a digital pressure regulator.

11. A position control apparatus as described in claim 1 wherein each of said remotely controllable regulators has a specific pressure associated therewith.

12. A position control apparatus as described in claim 11 wherein each of said specific pressures is different.

13. A position control apparatus as described in claim 1 wherein said controller is configured to repeatedly open and close said valves.

14. A position control apparatus as described in claim 13 wherein said controller is configured to control valves such that only one valve at most is open at a time.

15. A position control apparatus as described in claim 1 wherein said controller is configured to operate said electronic pressure regulator and open and close said valves so as to direct a specific pressure to one of said remotely controllable regulators.

16. A position control apparatus as described in claim 15 wherein said controller is configured to operate said electronic pressure regulator and open and close said valves so as to alternatingly direct a different specific pressure to a different one of said remotely controllable regulators.

17. A position control apparatus as described in claim 1 wherein each of said positioner zones comprises a plurality of positioners having a bias constant within a different range.

18. A positioner control method, comprising the steps of:
remotely controlling a first piloted pressure regulator so as to apply a first pressure to a first positioner zone that comprises a plurality of first zone positioners that position items traveling along a conveyor;
positioning said items using said first zone positioners;
remotely controlling a second piloted pressure regulator so as to apply a second pressure to a second positioner zone that comprises a plurality of second zone positioners that position said items traveling along said conveyor; and
positioning said items using said second zone positioners,
wherein said first zone positioners each have a bias constant within a first range, said second zone positioners each have a bias constant within a second range, and said first range is different from said second range.

19. A positioner control method as described in claim 18 further comprising the step of remotely controlling a third piloted pressure regulator so as to apply a third pressure to a third positioner zone.

20. A positioner control method as described in claim 18 further comprising the step of operating a controller to terminate application of said first pressure to said first positioner zone and initiate application of said second pressure to said second positioner zone.

21. A positioner control method as described in claim 20 wherein said step of operating a controller comprises the step of operating a controller to close a first valve and open a second valve.

22. A positioner control method as described in claim 20 wherein said step of operating a controller comprises the step of operating a controller to change an electronic pressure regulator output from said first pressure to said second pressure.

23. A positioner control method as described in claim 18 further comprising the step of inputting two pressure inputs to said first piloted pressure regulator.

24. A positioner control method as described in claim 23 wherein one of said inputs is an insufficiently regulated input that is in fluidic communication with input to an electronic pressure regulator established upflow of a first valve and the other of said inputs is a pilot input that is in fluidic communication with an output from said electronic pressure regulator.

25. A positioner control method as described in claim 18 further comprising the step of inputting two pressure inputs to said second piloted pressure regulator.

26. A positioner control method as described in claim 25 wherein one of said inputs is an insufficiently regulated input that is in fluidic communication with input to an electronic pressure regulator established upflow of a second valve and the other of said inputs is a pilot input that is in fluidic communication with an output from said electronic pressure regulator.

27. A positioner control method as described in claim 18 wherein said method is a side guide positioner control method.

28. A positioner control method, comprising the steps of:
remotely controlling a first piloted pressure regulator so as to apply a first pressure to a first positioner zone; then
operating a controller to terminate application of said first pressure to said first positioner zone and initiate application of a second pressure to a second positioner zone, and then
remotely controlling a second piloted pressure regulator so as to apply said second pressure to said second positioner zone,
wherein said step of operating a controller comprises the step of operating a controller to change an electronic pressure regulator output from said first pressure to said second pressure.

29. A positioner control method as described in claim 28 further comprising the step of remotely controlling a third piloted pressure regulator so as to apply a third pressure to a third positioner zone.

30. A positioner control method as described in claim 28 wherein said step of operating a controller comprises the step of operating a controller to close a first valve and open a second valve.

31. A positioner control method as described in claim 28 further comprising the step of inputting two pressure inputs to said first piloted pressure regulator.

32. A positioner control method as described in claim 31 wherein one of said inputs is an insufficiently regulated input that is in fluidic communication with input to an electronic pressure regulator established upflow of a first valve and the other of said inputs is a pilot input that is in fluidic communication with an output from said electronic pressure regulator.

33. A positioner control method as described in claim 28 further comprising the step of inputting two pressure inputs to said second piloted pressure regulator.

34. A positioner control method as described in claim 33 wherein one of said inputs is an insufficiently regulated input that is in fluidic communication with input to an electronic pressure regulator established upflow of a second valve and the other of said inputs is a pilot input that is in fluidic communication with an output from said electronic pressure regulator.

35. A positioner control method as described in claim 28 wherein each of said positioner zones comprises a plurality of positioners having a bias constant within a different range.

36. A positioner control method, comprising the steps of:
remotely controlling a first piloted pressure regulator by inputting two pressure inputs to said first piloted pressure regulator so as to apply a first pressure to a first positioner zone; then
remotely controlling a second piloted pressure regulator so as to apply a second pressure to a second positioner zone,
wherein one of said inputs is an insufficiently regulated input that is in fluidic communication with input to an electronic pressure regulator established upflow of a first valve and the other of said inputs is a pilot input that is in fluidic communication with an output from said electronic pressure regulator.

37. A positioner control method as described in claim 36 further comprising the step of remotely controlling a third piloted pressure regulator so as to apply a third pressure to a third positioner zone.

38. A positioner control method as described in claim 36 further comprising the step of operating a controller to terminate application of said first pressure to said first positioner zone and initiate application of said second pressure to said second positioner zone.

39. A positioner control method as described in claim 38 wherein said step of operating a controller comprises the step of operating a controller to close a first valve and open a second valve.

40. A positioner control method as described in claim 38 wherein said step of operating a controller comprises the step of operating a controller to change an electronic pressure regulator output from said first pressure to said second pressure.

41. A positioner control method as described in claim 36 further comprising the step of inputting two pressure inputs to said second piloted pressure regulator.

42. A positioner control method as described in claim 41 wherein one of said inputs is an insufficiently regulated input that is in fluidic communication with input to an electronic pressure regulator established upflow of a second valve and the other of said inputs is a pilot input that is in fluidic communication with an output from said electronic pressure regulator.

43. A positioner control method as described in claim 36 wherein each of said positioner zones comprises a plurality of positioners having a bias constant within a different range.

44. A positioner control method, comprising the steps of:
remotely controlling a first piloted pressure regulator so as to apply a first pressure to a first positioner zone; then
remotely controlling a second piloted pressure regulator by inputting two pressure inputs to said second piloted pressure regulator so as to apply a second pressure to a second positioner zone,
wherein one of said inputs is an insufficiently regulated input that is in fluidic communication with input to an electronic pressure regulator established upflow of a second valve and the other of said inputs is a pilot input that is in fluidic communication with an output from said electronic pressure regulator.

45. A positioner control method as described in claim 44 further comprising the step of remotely controlling a third piloted pressure regulator so as to apply a third pressure to a third positioner zone.

46. A positioner control method as described in claim 44 further comprising the step of operating a controller to terminate application of said first pressure to said first positioner zone and initiate application of said second pressure to said second positioner zone.

47. A positioner control method as described in claim 46 wherein said step of operating a controller comprises the step of operating a controller to close a first valve and open a second valve.

48. A positioner control method as described in claim 46 wherein said step of operating a controller comprises the step of operating a controller to change an electronic pressure regulator output from said first pressure to said second pressure.

49. A positioner control method as described in claim 44 further comprising the step of inputting two pressure inputs to said first piloted pressure regulator.

50. A positioner control method as described in claim 49 wherein one of said inputs is an insufficiently regulated input that is in fluidic communication with input to an electronic pressure regulator established upflow of a first valve and the other of said inputs is a pilot input that is in fluidic communication with an output from said electronic pressure regulator.

51. A positioner control method as described in claim 44 wherein each of said positioner zones comprises a plurality of positioners having a bias constant within a different range.

52. A positioner control method, comprising the steps of:
remotely controlling a first piloted pressure regulator so as to apply a first pressure to a first positioner zone that comprises a plurality of first zone positioners that position items for proper operation of a system;
positioning said items using said first zone positioners; then
remotely controlling a second piloted pressure regulator so as to apply a second pressure to a second positioner zone that comprises a plurality of second zone positioners that position said items; and
positioning said items using said second zone positioners,
wherein said first zone positioners each have a helical spring having a bias constant within a first range, said second zone positioners each have a helical spring having a bias constant within a second range, and said first range is different from said second range.

* * * * *